J. Naugle,
Tire-Bending Machine.
No. 97,107.  Patented Nov. 23. 1869.
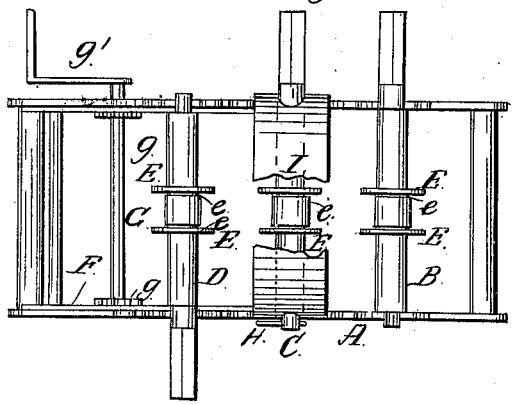
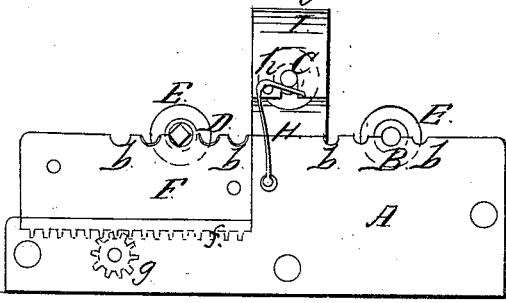
Witnesses
J. P. Theodore Lang
J. Snowden Bell
Inventor
John Naugle

United States Patent Office.

JOHN NAUGLE, OF MOORESVILLE, INDIANA.

Letters Patent No. 97,107, dated November 23, 1869; antedated November 10, 1869.

IMPROVED TIRE-BENDING MACHINE.

The Schedule referred to in these Letters Patent and making part of the same.

*To all whom it may concern:*

Be it known that I, JOHN NAUGLE, of Mooresville, in the county of Morgan, and State of Indiana, have invented certain new and useful Improvements in Tire-Bending Machines, of which the following is a full, clear, and exact description, reference being had to the accompanying drawings, which make part of this specification, and in which—

Figure 1 represents a plan or top view of my improved tire-bending machine, and

Figure 2, a side elevation of the same.

The object of my invention is to provide a simple and efficient tire-bending machine, by the use of which lateral twisting of the tire shall be obviated, and twisted tires straightened, as well as to afford convenient means for the insertion, binding, and removal of the tire; to which ends, I mount two rollers in bearings in a suitable frame, and a third roller upon a movable carriage.

Each roller is provided with a pair of collars set at a proper distance apart to suit the width of the tire, grooves being cut upon the rollers, within and adjacent to the collars, to admit the frayed edges of the tire.

The collars are placed upon the rollers, in such position, that when in operation, the three pairs shall be truly in line, thereby preventing any lateral twist being imparted to the tire.

One end of the centre roller is supported, when the machine is not in operation, upon a pivoted latch, which can be swung aside to admit or remove a tire when welded up, thus enabling the machine to be used for finishing or straightening imperfect or twisted tires.

In the accompanying drawings, which show a convenient arrangement of parts for carrying out the objects of my invention—

A represents the frame of the machine, and

B and C, rollers, which rest in bearings therein.

A third roller, D, is mounted in bearings in a movable carriage, F, which slides on ways upon the frames.

The centre roller B moves in bearings in an arched support, I, attached to the frame, one of its ends being supported, when not in operation, upon a pivoted latch, H, on the frame, which rests on a pin, $h$, on the support.

This latch can be swung aside at pleasure to admit of the insertion or removal of tire.

The distances of the rollers B and D from the centre roller can be varied, to suit different curvatures, by means of the series of bearings $b\ b$ in the frame A and carriage F.

Each roller is provided with a pair of collars, E E, set at such a distance apart as will admit a tire, of the width required, different rollers being necessary for different widths of tire.

The collars are fixed upon the rollers in such position that the three pairs shall be truly in line when the machine is in operation, by which means all liability to lateral twisting of the tire is obviated, and the machine rendered adaptable to straightening twisted tires.

Grooves $e\ e$ are formed upon the rollers within and adjacent to the collars E E, which receive the splinters or fraying which are often found on the edges of the tire, and thereby cause it to fit more truly upon the rollers.

The tire is bent by means of the roller D, which rests in bearings in the movable carriage F. This carriage slides on ways or guides on the frame A, and is operated by means of a shaft, G, mounted in bearings in the frame, and carrying two pinions, $g\ g$, which gear into racks $f\ f$, upon the carriage.

By rotating the shaft, by means of the crank $g'$, movement is readily and conveniently imparted to the carriage.

Having thus fully described my invention,

What I claim therein as new, and desire to secure by Letters Patent, is—

1. In combination with a tire-bending machine, a series of interchangeable collared rollers, as and for the purpose specified.

2. Forming grooves in the rollers adjacent to the collars, as and for the purpose specified.

3. In combination with the frame A, the pivoted latch H, arched support I, and roller C, as and for the purpose specified.

4. In combination with the frame A, and rollers B and C, the carriage F, racks $f\ f$, pinions $g\ g$, and shaft G, as and for the purpose specified.

JOHN NAUGLE.

Witnesses:
J. SNOWDEN BELL,
JOHN S. HOLLINGSHEAD.